Patented June 6, 1950

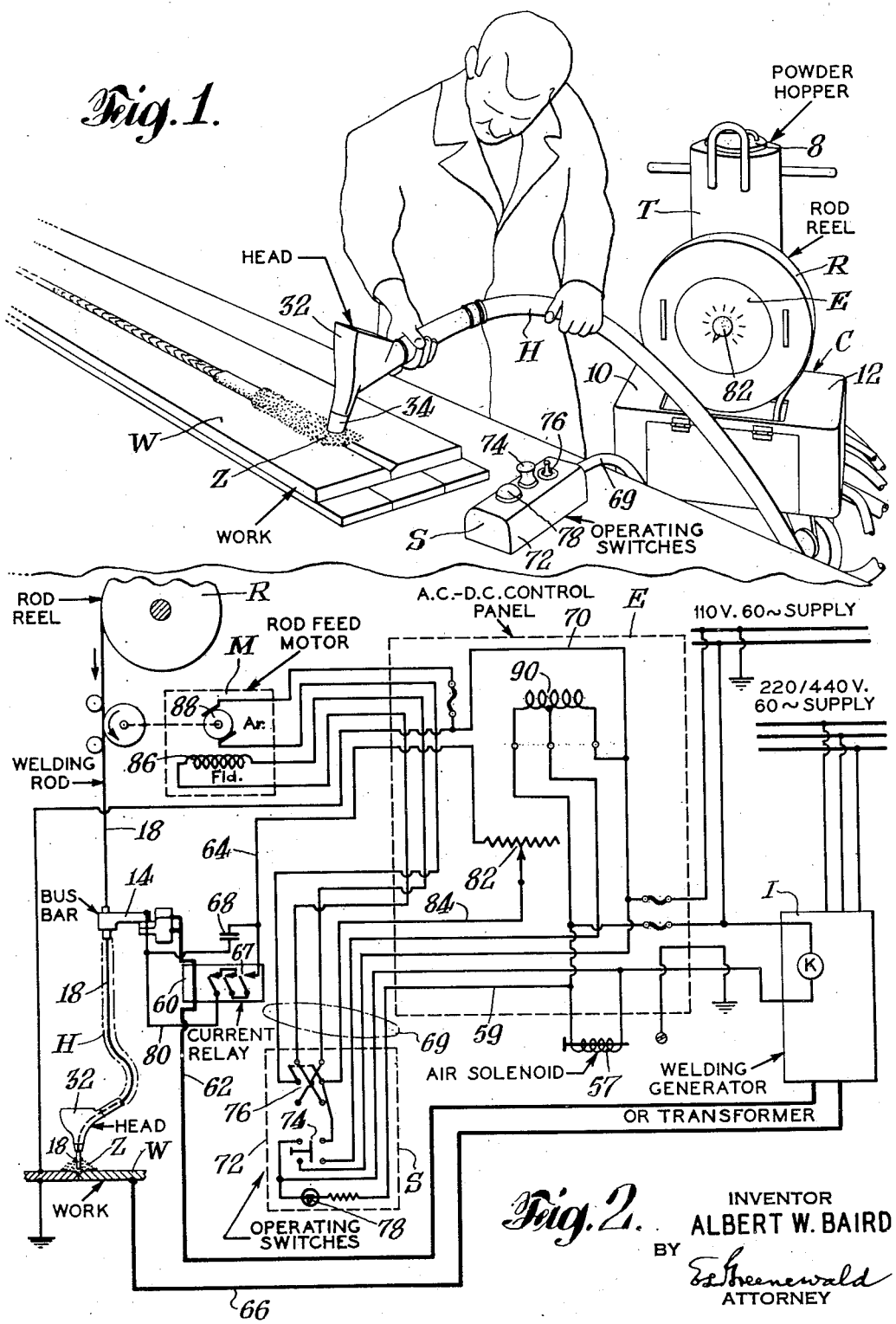

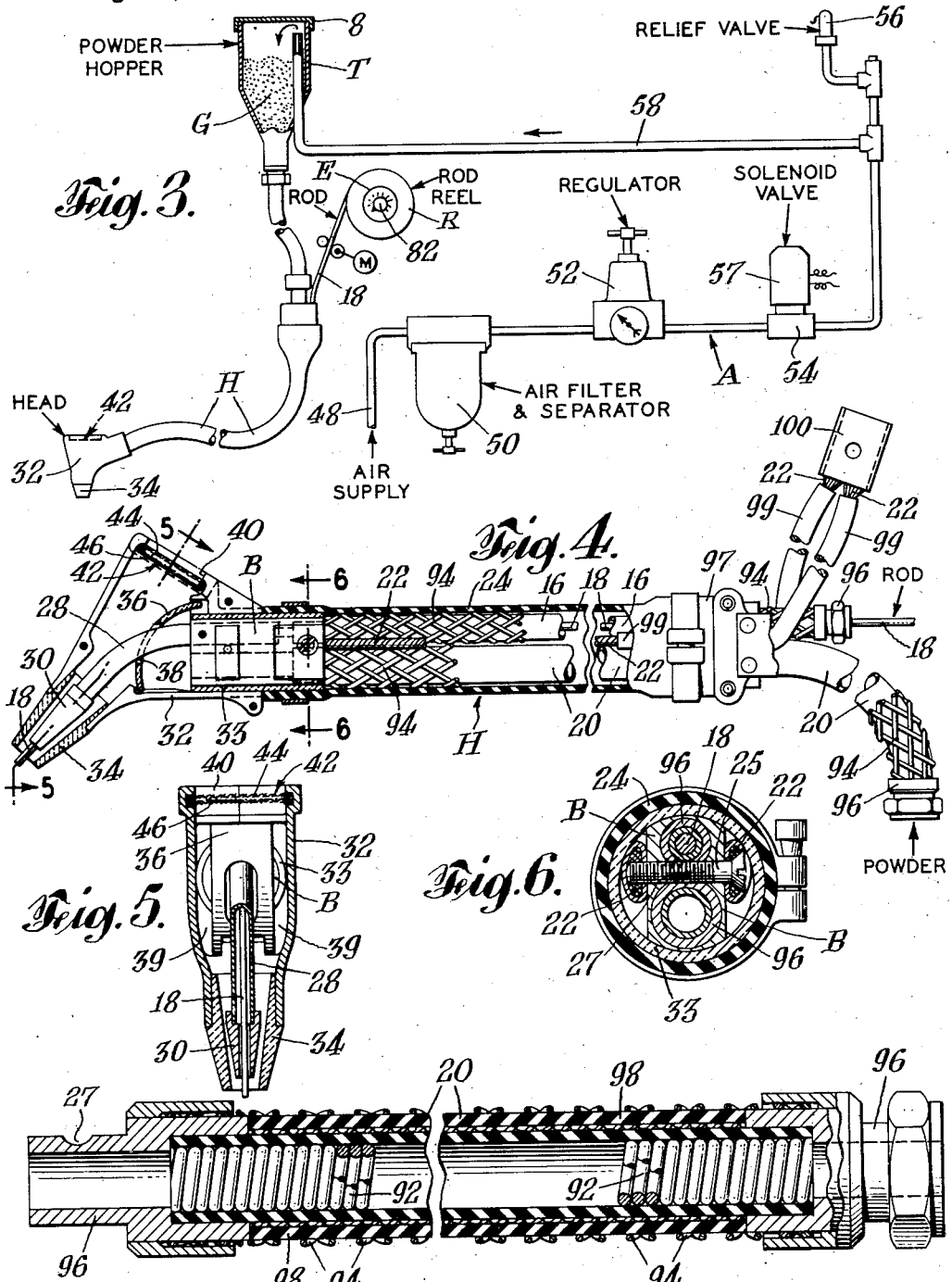

2,510,204

UNITED STATES PATENT OFFICE 2,510,204

FLEXIBLE SUBMERGED MELT WELDING MACHINE

Albert W. Baird, Cranford, N. J., assignor to The Linde Air Products Company, a corporation of Ohio Application August 14, 1948, Serial No. 44,303

16 Claims. (Cl. 219—8)

1

This invention relates to electric welding and more particularly to a portable manual type flexible welder for carrying out the submerged melt welding process of Jones et al. Patent 2,043,960.

In the past satisfactory electric welding according to such process has been confined mainly to fully mechanized welding, because of the heavy and complicated equipment needed to support and progressively feed the granular welding material and the welding rod to the welding zone. However, there is considerable demand for a welder which can be manipulated for making repairs and for welding irregular and relatively inaccessible parts. Such demand has been largely unsatisfied, prior to the present invention, due to the difficulties involved in successfully guiding the metal welding rod, conducting the granular welding material, supplying a heavy current to the rod without arcing, and keeping cool the manually supported head through which the rod and granular material are fed during the progress of the welding operation.

Therefore, the main object of this invention is to provide a flexible manually operable welder which overcomes such difficulties and is, at the same time, effective, reliable, safe and efficient in operation; compact, simple and rugged yet economical in its parts, relatively light, and easy to control and manipulate. Another object is to provide a flexible welder in which the operator has merely to position and move the head properly for welding, whereupon automatic controls carry out all other necessary operations. A further object is to provide automatic shut-off means when the nozzle is removed from the work and the head is turned from its normal welding position. Another object is to provide means by which welding can be accomplished above the level of the granular flux supply. Other objects will appear from the following description.

Briefly, according to the invention, there is provided a portable carriage, or for some purposes a stationary support, on which a granular flux supply tank or container and rod or wire supply reel are mounted, together with a compressed air inlet, a rod-feed motor and electrical control manifold. A compressed air supply conduit and an electrical supply cable lead to the carriage and are adapted to be connected to suitable sources of air under pressure, and welding current (A. C. or D. C.). The rod, flux, air, and electric welding current are all transmitted to a welding head through a flexible hose, the inlet end of which is connected to the carriage. The head, which is adapted to be held by the operator during the welding operation, is provided with means for separating the air and flux, and guiding the latter and the rod toward the work as long as the head is in use. A handy control switch box, which is connected to the carriage by a flexible cable, is also provided for controlling the operation of the machine at the will of the operator.

The assembly includes an automatic rod feed mechanism and voltage control unit. The voltage control unit is provided with a welding voltage adjustment knob. Meters included on the generators or transformers used for supplying welding power are sufficient for checking currents and voltages. Two switches in the small portable switch box provide convenient operating control. A toggle switch in the box may be set to "feed" position, except when initially adjusting the length of the rod before starting to weld, or when retracting the final piece of a coil or wire from the tube, at which time it may be set to the "retract" position. A "push-pull, twist lock" knob switch in the box provides both for feeding the rod through the tube when starting a new coil, or for inching adjustments prior to first starting to weld, and also provides means for closing and opening the contactor on the primary side of the welding transformer, or the starting contactors on the motor generator set. An indicating light on the switch box shows when the welding power contactor is "on."

The invention combines the desirable features of automatic controlled continuous feeding of welding wire and automatic continuous feeding of granular welding composition in a unit which can be easily manipulated. The welding head at the end of the flexible hose is convenient to handle and the continuous flow of granular material around the end of the rod makes it possible to guide the welding rod quite accurately. Using this equipment an operator with brief experience can make a weld deposit in almost any shape and to any outline he may desire.

In the drawing:

Fig. 1 is a perspective view of a flexible welder illustrating the invention;

Fig. 2 is a circuit diagram;

Fig. 3 is a flow diagram of the granular material-compressed air-feed system;

Fig. 4 is a fragmentary view partly in side elevation and partly in section of the welding head and flexible hose assembly;

Figs. 5 and 6 are cross-sectional views taken on lines 5—5 and 6—6; and

Fig. 7 is a fragmentary sectional detail of the air-flux conducting tube.

The illustrated flexible submerged melt welding machine comprises an enclosed dolly or carriage C; a granular welding flux or composition storage tank or hopper T having an air-tight but removable cover 8 and a vertical cone-shaped bottom; a rod reel R with an electrical control panel E mounted in the central portion thereof; a granular flux and welding rod transfer hose assembly H; an operating control S; a welding rod feed motor M; and an air manifold A. The tank will hold enough flux for use with a full coil of rod.

The storage tank T and rod reel R with the electrical controls E are mounted on the top 10 of the carriage casing 12. The welding rod feed motor M, air manifold A and other accessories are attached to the underside of the carriage casing top 10. The granular flux and welding rod transfer hose assembly H is attached at its inlet end to the bus bar 14 of the welding rod feed motor M.

The granular flux and welding rod hose assembly H comprises a steel inner-lined rubber flexible tube 16 through which welding wire or rod 18 is fed by the welding rod feed motor M from the rod reel R; a steel inner-lined rubber flexible tube 20 through which granular flux G is fed from the storage tank T by means of air under pressure; and two bare wire conductors 22 for conducting the welding current. Such parts are incased in a flexible rubber hose 24 and terminate at a cylindrical block B of metal, and are secured together by a key-bolt 25 which passes through the terminals of the conductors, the block and grooves 27 in the ferrules 96.

On the other end of the block B, in line with the welding rod tube 20, is attached a curved pipe 28 composed of beryllium-copper or other wear resistant conductive material, having a tip 30 of similar material. An individual tip 30 is used for each size welding rod 18. The block B, curved pipe 28 and tip 30 are incased in a two piece light-weight aluminum head 32. The head is insulated electrically from the block B by a sleeve 33 of insulating material. At the outer end of the head 32 is a guard nozzle 34 composed of ceramic or molded glass material to withstand high temperature. The axis of the nozzle, in the illustrated example, forms an angle of less than 180° with respect to that of the inlet portion of the head 32. A curved baffle 36 of insulating material is positioned within the head 32 and has a central opening 38 through which the curved (rod-guiding) pipe 28 extends.

The curved baffle 36 has a lateral opening 39 between each side of the baffle and the adjacent inside wall of the head 32. The lower part of the openings 39 allows the granular flux to flow downwardly through the nozzle 34. The upper half of the openings 39 allows the small amount of air entrained with the granular flux to escape out through a screened-cloth covered vent 40.

The vent 40 is located in the top of the head 32, opposite the nozzle 34. A screened-cloth filter unit 42 is positioned in the vent 40 with a metal screen 44 on the inside of the head 32. The metal screen 44 protects the cloth 46 from being imbedded or clogged with particles of flux, which in time would impair the efficiency of the filter 42, and the cloth 46 prevents very fine or dust-like particles from escaping with the air.

The curved baffle 30 also acts as a check valve for the air and flux flow when so desired. When the head 32 is placed on its side or held in an upright position, the flux fills up the space back of the baffle, stopping the flow of flux and air, even with the air pressure "on."

The inlet air manifold A, includes an air inlet conduit 48, an air filter and separator unit 50, an adjustable air pressure regulator 52, a solenoid air-valve 54, and a relief or safety valve 56. Solenoid 57 is included in the contactor circuit 59. The solenoid-air valve 54 opens when the contactor switch 74 is turned on, causing air under pressure to flow to the granular flux storage tank T by way of the pipe 58, the outlet end of which opens in the tank above the top of the granular flux G. The air pressure regulator 52 gives the desired air pressure for feeding flux G from the storage tank T, through the flexible flux transfer tube 20, head 32 and nozzle 34 to the welding zone Z. The normal air pressure is approximately 40 pounds per square inch for coarser flux (12 x 200 screen size) and for a tube length of about 20 feet. For finer flux, less pressure is required. The air filter and separator unit 50 prevents the flux from being contaminated in the storage tank. The safety valve 56 is set to relieve at 75 pounds per square inch.

Also mounted inside of the carriage casing 12 is a current relay 60, through which a welding cable 62 passes, for closing the rod feed motor circuit 64 when welding current flows through the welding cables 62 and 66. Connected across the relay contacts 67 is a condenser 68 for minimizing arcing. The welding current cables 62 and 66 are connected to any suitable source of welding current supply, such as a transformer I or generator, having an amperage adjustment K. While an A. C. supply is shown, D. C. may be used.

The operating control S comprises an 8-conductor extension cable 69 connected to the voltage control circuit 70, and terminating in the portable switch box 72. The box 72 contains an inching and contactor switch 74, a rod feed and retract switch 76 and a red neon lamp 78 which indicates when the contactor switch 74 is "on."

The current relay contacts 67 are connected in series with a bus bar welding voltage lead 80, so that the relay 60 keeps the rod feed motor circuit 64 open until the end of the welding rod 18 contacts the workpiece W, and the current starts to flow. The relay 60 then operates closing the circuit 64, which after the arc is established starts the motor M and rod to feed. The current relay 60 prevents the motor M from feeding rod 18 on "open circuit" welding voltage. When the relay 60 is closed, a current resulting from the welding voltage flows through motor M and a rheostat 82, which can be set to reduce the welding voltage to the amount necessary for the motor M to feed rod 18 at a rate sufficient to maintain a constant "welding voltage" between the end of the rod 18 and workpiece W. Rod 18 will continue to be fed until the flow of welding current is interrupted, causing the relay 60 to return to the normally open position and thus open the feed motor circuit 64.

From the rheostat 82 current flows via conductor 84 through the reversing switch 76, then through the field 86 and armature 88 of the rod feed motor M and welding voltage ground lead 66. The switch 76 changes the direction of rotation of the rod feed motor M by reversing the polarity of the motor field 86 with respect to the armature 88. An auto-transformer 90 in the control circuit supplies current to the rod feed motor M for inching the welding rod. The inching circuit is completed through the combined contactor and inching switch 74 on the remote switch box 72.

The connecting ends of the welding rod tube 16 and flux tube 20 were originally constructed of molded ferrule ends with a steel liner 92 screwed into the ferrules and outer braiding and rubber covering vulcanized to the rubber covered ferrules. The elasticity of the braid caused the inner steel liner to stretch and the synthetic braid to be cut by the steel inner liner and fail. This was rectified by using a basket weave type cable grip 94. This basket weave grip 94 is made a part of a metal ferrule 96, and grips the outer rubber casing 98 of the tube. Each end portion of each tube is engaged by such a grip of wire which is connected to a suitable ferrule of metal for convenient connection to the block B at one end and the bus bar 14, and to the bottom outlet of the tank T. The parts entering the hose H are tied together by a suitable coupling 97 of metal which is also attached to the bus bar 14. Lengths of "spaghetti" insulation 99 insulate the conductors 22 from the coupling 97, the conductors being connected to a common terminal 100. The greater the tensile pull is, the tighter the grip 94. This also has another great advantage, i. e., the tubing can be manufactured with plain ends to suit the grip and if at any time the tubing is damaged, it can be replaced very quickly with another tubing without wasting the ferrules. An added advantage is that the tubing can be replaced very easily if smaller or larger inside diameters are preferred, as long as the outer casing diameter is maintained to fit the ferruled cable grip 94. The grip is especially advantageous at the inlet end of the tube which conducts the rod.

In operation, the rod feed switch 76 is moved to "feed" position and the "inching" switch 74 is pushed down and turned to lock it, until the rod emerges about one inch from the nozzle. The switch 74 is then pulled out and locked. Welding is easily started then by turning the welding nozzle 34 so that the granular material G is discharged over the point where the weld is to begin and, at the same time, bringing the projecting end of the welding wire 18 into contact with the workpiece W through the pile of granular material. A slight rubbing or scratching movement may be necessary if a particle of granular material happens to be under the end of the rod 18 or if the rod has been previously used and may have a bit of fused material adhering to it. The flow of welding current which occurs when the rod 18 comes in contact with the workpiece W actuates the relay 60 which closes the rod feed motor circuit 64 and starts the controlled feed of welding rod 18 after welding has started.

To stop welding, it is only necessary to lift the nozzle 34 away from the workpiece W and break the welding current circuit. The rod feed stops when welding current ceases to flow. The granular material is shut off in the back of the nozzle 32 if the discharge nozzle is tilted to an approximately horizontal position. The automatic control of rod feed compensates for any minor up or down movements of the nozzle 34 in the operator's hands so that uniform welding voltage is maintained. The air which feeds the flux also helps somewhat to keep the head cool during the welding operation. The positive air flux-feeding system makes it possible to weld above the level of the flux supply. Internal arcing is prevented by the use of bare wire conductors in the hose which insure substantially the same potential between the rod and the hose parts throughout the length of the hose and good electrical contact of the curved pipe with the rod as the latter passes therethrough and is forced to change direction, providing an effective electrical brush. The flexible tubes which conduct the rod and flux, being lined with metal, i. e., a steel D-wire helix, do not collapse or otherwise interfere with the feed of the rod and air-fed flux. The metal lined tubing is not subject to undesirable rippling due to the compressed air-backed flux, but conveys such flux evenly therethrough.

If desired, the controls, tank and reel can be mounted on a stationary base instead of on a dolly or carriage.

What is claimed is:

1. Apparatus for electric welding of the type in which a bare rod of weld metal is fed toward work composed of the metal being welded while a welding current flows through such rod and the work and the welding zone is covered with a granular welding composition during the welding operation, comprising a carriage on which means for supplying granular welding composition and means for supplying welding rod are mounted, a flexible hose having one end connected to the carriage in communication with the means for supplying welding rod, welding composition and the welding current, a head having a nozzle connected to the other end of the hose, means for positively feeding such rod through the hose, and means for positively feeding such granular welding composition through the hose as the welding operation progresses.

2. An electric welding machine comprising a carriage on which are mounted a welding rod supply reel, a granular welding composition supply container, and one end of a flexible hose, a manual welding head connected to the other end of said hose, means for guiding a welding rod from said reel through said head, said head having a nozzle through which the rod is fed, a rod feed motor mounted on said carriage for feeding said rod from the reel, and means for connecting said container to a source of gas under pressure so that the granular welding composition is fed by the action of such gas through the hose to the nozzle from which it is discharged around the welding rod, said head having an opening above said nozzle, covered with a filter which vents such gas but retains the granular welding flux in the head on its way to the nozzle.

3. An electric welder comprising a welding rod reel and a granular welding composition container, a flexible hose, a head connected to the outer end of said hose, said head having a nozzle and a filter covered vent opposite such nozzle, a motor for feeding welding rod from the reel through the hose and nozzle, and means for feeding the granular welding composition, including means establishing a gas pressure differential between the top of said container and the vent of said head such that the granular welding flux is caused to flow through the hose toward the head from which it is discharged around the rod by way of the nozzle.

4. In a machine for submerged melt electric welding under a mass of granular welding material, means comprising a flexible tube for conducting such material to the welding zone, and means urging such material to flow from the tube in a steady stream, comprising a closed hopper containing a supply of such material, the bottom of the hopper being in communication with the inlet end of the tube, and conduit means for applying gas under pressure to the top of the material in said hopper, whereby the granular material is positively fed by such gas through the tube from the hopper to the welding zone.

5. In a machine for submerged melt electric welding, as defined by claim 4, a head connected to said tube, having a nozzle adapted to discharge such granular welding material, and said head also having a vent located above such nozzle to discharge the gas before such granular material enters the nozzle.

6. A submerged melt electric welder comprising a carriage including a casing having a top which supports both a rod reel and a granular flux container, flexible tube means that guide both the flux and the welding rod, extending into the casing; and mechanisms within the casing for feeding welding rod from the reel into the guide tube and for feeding granular flux from the bottom of the flux container into the guide tube entrance within the carriage casing.

7. A flexible hose containing a flexible metal inner-lined rubber tubing for guiding a current-conducting filler rod and a metal flexible inner-lined rubber tubing for conveying compressed air-backed granular welding flux to the welding zone, welding current conductors of bare wire, and a welding current supply connection, such conductors being uninsulated to inhibit arcing within the tubing and to avoid fusion and freezing of the filler rod to the metal lined interior of the flexible tubing, means connected to the outlet ends of said tubing for guiding the flux and rod and for conducting the welding current from the conductors to the rod, the metal lined interior of the flexible tubing acting to convey the compressed air-backed flux evenly therethrough.

8. In a flexible welder of the class set forth, a rod guiding and granular flux feeding head having a top vent provided with a cover of fabric to allow dust-free gas to escape, said cover being readily removable from the opening for inspection of the interior of the head, and having a metal screen spaced inwardly therefrom for keeping the fabric free of clogging particles of flux, said head containing means for guiding a welding rod, and means for feeding granular flux around such rod guiding means.

9. In a flexible welder, a flexible hose containing flexible tubular means for separately conducting a welding wire and granular welding material toward the outlet end of the hose, a motor for feeding said wire, a compressed air supply for feeding the granular material, a head attached to said hose for directing such wire and granular material, said head having an insulated nozzle the axis of which is located at an angle of less than 180° with respect to that of the main part of the head, said head also having an air vent located above said nozzle, a curved pipe of electrically conductive material ending in a tip disposed within said nozzle for directing the welding wire axially out of the head, there being an annular space between the nozzle and tip providing an outlet for the granular material, and a baffle disposed between said pipe and the inner wall of said head, having lateral relatively narrow openings for the normal passage of the granular material downwardly and the air upwardly when the head is in use, which baffle however acts to stop the flow of granular material and air when the head is positioned on its side or upside down.

10. A submerged melt welding head having a compressed air and granular flux inlet, a granular flux outlet and an air vent, such air vent being located above the inlet, and the outlet being located below such inlet, and a baffle in the head disposed between the inlet and the outlet and also between the air vent and the inlet, said baffle having lateral openings through the lower half of which the granular flux passes and through the upper half of which the air passes when the head is in normal position, thus separating the air from the granular flux, the arrangement being such that, when the head is turned from such position, the air and flux flow is stopped.

11. The combination with a flexible hose containing separate flexible tubes for transmitting wire and granular flux from suitable sources of supply, of means for positively feeding such wire and means for positively feeding such flux through said tubes, a head connected to said hose having coaxial nozzles for discharging such wire and flux from the head, and means comprising a baffle in the head operative to stop the feeding of the flux when the head is tilted with respect to its normal operative position.

12. In a flexible welder for submerged melt electric welding under a blanket of granular welding composition, a flexible hose containing a flexible tube for conducting granular welding composition, a flexible tube for conducting a welding wire, and a pair of welding current conductors, metal ferrules connected to basket-weave type cable grips which engage the end portions of said tubes, a block of electrically conductive metal securing said ferrules in place, terminals connected to the ends of said welding current conductors, a key-bolt extending through said terminals and the block, a curved pipe of electrically conductive metal secured at one end to said block in line with said wire conductive tube for guiding the wire and at the same time constituting an electrical brush, a tip of electrically conductive metal secured to the other end of said pipe, and a head secured to and insulated from said block having a curved passageway for the granular welding composition around said pipe, and a nozzle of electrically insulating material surrounding said tip in spaced relation, said head being provided with a baffle having lateral openings for separating air from the granular welding composition when the head is in use, the baffle stopping the flow of such granular welding composition when the head is not in use.

13. A submerged melt welding machine comprising a granular welding flux supply container, a welding wire supply reel, a compressed air manifold, a wire-feed motor and electrical control devices for the motor, a compressed air supply conduit connected to said manifold, an electrical supply cable adapted to be connected to a suitable source of current, a flexible hose, said hose containing means for transmitting the wire, means for transmitting the flux and means for transmitting the air, and also means for transmitting the welding current, a head connected to the outer end of said hose which is adapted to be held by an operator during the welding operation, said head being provided with means for separating the air and flux, and guiding the flux and the wire toward the work as long as the head is in use, and a handy control switch box connected to said electrical control devices by a separate cable.

14. A flexible submerged melt welding machine comprising a carriage including a casing, a granular welding flux container, a welding rod reel and electrical controls mounted on the top of said casing, a welding rod feed motor and compressed air inlet manifold attached to the underside of said casing top and communicating with the top of said container, a flexible tube assembly including a hose connected at its inlet end to the carriage, a welding flux tube in communication with the bottom of said container, a welding rod tube in communication with said reel, and at least one conductor of welding current in said hose, means insulating such conductor from the tubes, a head having an inlet portion connected to the outer end of said hose, said head containing an air-flux separator and substantially concentric tip and nozzle means for guiding the flux and rod toward the work, and means operatively associated with said conductor for transmitting welding current to the rod as the rod passes through the head, said means being located in the area of the juncture between the head and hose, and including a block of conducting metal insulated from the head and secured to said tubes, and a pipe of conductive metal through which the rod is guided on the way to the tip.

15. A flexible submerged melt welding machine comprising means on which are mounted supplies of granular flux and welding rod, a flexible hose containing separate tubes for conducting such flux and rod therethrough, a head connected to said hose and operatively associated with the outlet ends of said tubes for discharging the rod and the flux around the rod, and means for positively feeding the rod and means for positively feeding flux through said tubes even when the head is above the level of the flux supply, comprising a rod feed motor and a compressed air inlet for applying air under pressure to the top of the flux supply.

16. In an automatic submerged melt flexible welder, the combination with means for conducting granular flux and means for conducting welding rod to the welding zone, of a motor for feeding said rod, a compressed air supply line containing a valve for feeding said flux, and a control circuit responsive to the welding current for energizing said motor, said control circuit including a contactor switch and means operatively associated with said air valve for opening the valve when the contactor switch is closed.

ALBERT W. BAIRD.

REFERENCES CITED

The following references are of record in the file of this patent:

UNITED STATES PATENTS

| Number | Name | Date |
| --- | --- | --- |
| 1,630,895 | Herbst | May 31, 1927 |
| 1,641,149 | Bernert | Sept. 6, 1927 |
| 1,746,207 | Alexander | Feb. 4, 1930 |
| 1,881,507 | Gredell | Oct. 11, 1932 |
| 2,305,644 | Stone | Dec. 22, 1942 |
| 2,402,937 | Stringham | June 25, 1946 |
| 2,420,221 | Bell | May 6, 1947 |
| 2,444,834 | Landis | July 6, 1948 |